United States Patent
Titi et al.

(10) Patent No.: US 9,992,443 B2
(45) Date of Patent: Jun. 5, 2018

(54) SYSTEM AND METHODS FOR TIME LAPSE VIDEO ACQUISITION AND COMPRESSION

(71) Applicant: Apple Inc., Cupertino, CA (US)

(72) Inventors: Justin S. Titi, Morgan Hill, CA (US); Jeffrey A. Brasket, San Francisco, CA (US); Elliott B. Harris, San Francisco, CA (US); Johnnie Manzari, San Francisco, CA (US); Graham Clarke, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 14/292,316

(22) Filed: May 30, 2014

(65) Prior Publication Data
US 2015/0350591 A1    Dec. 3, 2015

(51) Int. Cl.
| | |
|---|---|
| *H04N 5/225* | (2006.01) |
| *H04N 5/77* | (2006.01) |
| *H04N 5/917* | (2006.01) |
| *H04N 9/80* | (2006.01) |
| *H04N 5/783* | (2006.01) |
| *H04N 5/76* | (2006.01) |
| *H04N 5/765* | (2006.01) |
| *G08B 13/196* | (2006.01) |
| *H04N 5/232* | (2006.01) |
| *H04N 5/915* | (2006.01) |
| *H04N 5/351* | (2011.01) |
| *H04N 9/804* | (2006.01) |

(52) U.S. Cl.
CPC ....... *H04N 5/783* (2013.01); *G08B 13/19665* (2013.01); *H04N 5/232* (2013.01); *H04N 5/351* (2013.01); *H04N 5/7605* (2013.01); *H04N 5/765* (2013.01); *H04N 5/915* (2013.01); *H04N 5/772* (2013.01); *H04N 9/8042* (2013.01)

(58) Field of Classification Search
CPC .......... H04N 5/77; H04N 5/765; H04N 5/917; H04N 9/80; H04N 5/23229; H04N 1/212; G02B 21/24; G02B 21/367
USPC .............. 386/226, 233, 248, 329; 348/220.1, 348/222.1, 231.99
See application file for complete search history.

(56) References Cited

U.S. PATENT DOCUMENTS

| | | | |
|---|---|---|---|
| 5,867,214 A | 2/1999 | Anderson | |
| 6,636,220 B1 | 10/2003 | Szeliski | |
| 6,665,342 B1 | 12/2003 | Brown | |
| 7,110,025 B1 * | 9/2006 | Loui | H04N 5/232 |
| | | | 348/220.1 |

(Continued)

FOREIGN PATENT DOCUMENTS

| | | |
|---|---|---|
| CN | 103685933 A | 3/2014 |
| EP | 1557837 A1 | 7/2005 |

(Continued)

*Primary Examiner* — Thai Tran
*Assistant Examiner* — Syed Hasan
(74) *Attorney, Agent, or Firm* — Blank Rome LLP

(57) ABSTRACT

Techniques and devices for acquiring and compressing timelapse video are described. The techniques are adaptive, in that the acquisition frame rate is adapted and captured images are periodically deleted during filming. To implement the method, a user need not know ahead of time how long the source video will be acquired. Regardless of the acquisition time, the resulting video is automatically edited to provide a timelapse clip of a predefined length or of a length within a predefined range.

20 Claims, 3 Drawing Sheets

(56) References Cited

U.S. PATENT DOCUMENTS

| | | | |
|---|---|---|---|
| 7,295,230 | B2 | 11/2007 | Takahashi |
| 7,450,162 | B2 | 11/2008 | Shioji |
| 7,499,588 | B2 | 3/2009 | Jacobs |
| 7,880,936 | B2 | 2/2011 | Shiiyama |
| 7,990,430 | B2 | 8/2011 | Okamoto |
| 8,118,216 | B2 | 2/2012 | Hoch |
| 8,194,993 | B1 | 6/2012 | Chen |
| 8,340,453 | B1 | 12/2012 | Chen |
| 8,515,270 | B1 | 8/2013 | Posehn |
| 8,657,988 | B2 | 2/2014 | Fan |
| 8,681,237 | B2 | 3/2014 | Battles |
| 8,711,495 | B2 | 4/2014 | Topliss |
| 8,830,347 | B2 | 9/2014 | Jin |
| 8,866,928 | B2 | 10/2014 | Geiss |
| 9,077,910 | B2 | 7/2015 | Ninan |
| 2001/0050875 | A1 | 12/2001 | Kahn |
| 2003/0146981 | A1* | 8/2003 | Bean ............... H04N 5/2353 348/222.1 |
| 2003/0202777 | A1 | 10/2003 | Kogusuri |
| 2005/0018049 | A1 | 1/2005 | Falk |
| 2006/0285831 | A1* | 12/2006 | Tanaka ............. H04N 5/232 386/233 |
| 2007/0127573 | A1 | 6/2007 | Soroushian |
| 2007/0189728 | A1 | 8/2007 | Yu |
| 2008/0253758 | A1 | 10/2008 | Yap |
| 2009/0222163 | A1 | 9/2009 | Plante |
| 2009/0237502 | A1 | 9/2009 | Maiya |
| 2009/0309989 | A1 | 12/2009 | Tanaka |
| 2010/0053345 | A1 | 3/2010 | Kim |
| 2010/0215348 | A1 | 8/2010 | Saito |
| 2011/0075736 | A1 | 3/2011 | Endo |
| 2011/0243453 | A1 | 10/2011 | Kashima |
| 2012/0114304 | A1* | 5/2012 | Mikawa ............. H04N 5/783 386/248 |
| 2012/0257071 | A1 | 10/2012 | Prentice |
| 2013/0063584 | A1 | 3/2013 | Nakasho |
| 2013/0071031 | A1 | 3/2013 | Huang |
| 2013/0202151 | A1 | 8/2013 | Dauwels |
| 2013/0202185 | A1 | 8/2013 | Irwin |
| 2013/0215289 | A1 | 8/2013 | Vitsnudel |
| 2013/0308036 | A1 | 11/2013 | Peng |
| 2013/0336590 | A1 | 12/2013 | Sentinelli |
| 2014/0049657 | A1 | 2/2014 | Fukunishi |
| 2014/0052636 | A1 | 2/2014 | Mattes |
| 2014/0078343 | A1* | 3/2014 | Dai ................. H04N 5/772 348/231.99 |
| 2014/0085495 | A1 | 3/2014 | Almalki |
| 2014/0105564 | A1 | 4/2014 | Johar |
| 2014/0285718 | A1 | 9/2014 | Murakami |
| 2014/0362247 | A1 | 12/2014 | Fujita |
| 2015/0043893 | A1 | 2/2015 | Nishizaka |
| 2015/0086176 | A1 | 3/2015 | Komiya |
| 2015/0215537 | A1 | 7/2015 | Nishizaka |
| 2015/0294686 | A1 | 10/2015 | Autioniemi |
| 2015/0312463 | A1 | 10/2015 | Gupta |

FOREIGN PATENT DOCUMENTS

| | | | | |
|---|---|---|---|---|
| JP | 2002135724 | A | | 5/2002 |
| JP | 2011015079 | A | * | 1/2011 ............. H04N 7/173 |
| WO | 2014166862 | A1 | | 10/2014 |

\* cited by examiner

SYSTEM AND METHODS FOR TIME LAPSE VIDEO ACQUISITION AND COMPRESSION

CROSS-REFERENCE TO RELATED APPLICATIONS

This disclosure is related to the subject matter of commonly-assigned U.S. patent application Ser. No. 14/292,547, entitled, "Systems And Methods For Exposure Metering for Timelapse Video," which was filed on May 30, 2014 ("the '547 application").

BACKGROUND

This disclosure relates generally to the field of video capture, and more particularly, to acquiring timelapse video.

The advent of portable integrated computing devices has caused a wide proliferation of cameras and video devices. These integrated computing devices commonly take the form of smartphones or tablets and typically include general purpose computers, cameras, sophisticated user interfaces including touch sensitive screens, and wireless communications abilities through WiFi, LTE, HSDPA and other cell-based or wireless technologies. The wide proliferation of these integrated devices provides opportunities to use the devices' capabilities to perform tasks that would otherwise require dedicated hardware and software. For example, as noted above, integrated devices such as smartphones and tablets typically have one or two embedded cameras. These cameras generally amount to lens/camera hardware modules that may be controlled through the general purpose computer using firmware and/or software (e.g., "Apps") and a user interface including the touchscreen fixed buttons and touchless control such as voice control.

The integration of cameras into communication devices such as smartphones and tablets has enabled people to share images and videos in ways never before possible. It is now very popular acquire and immediately share photos with other people by either sending the photos via text message, SMS, or email, or by uploading the photos to an internet-based website, such as a social networking site or a photo-sharing site.

Immediately sharing video is likewise possible, as described above for sharing of photos. However, bandwidth limitations and upload times significantly constrain the length of video that can easily be shared. In many instances, a short video clip that captures the essence of the entire action recorded may be desirable. The duration of the video clip may depend on the subject matter of the video clip. For example, a several hour car ride or an evening at a party might be reduced to a timelapse video clip lasting only a minute or two. Other action, such as a sunset or the movement of clouds, might be better expressed in a clip of twenty to forty seconds. While a timelapse video of shortened duration may be desired, a user often may wish to acquire video (termed herein "source video") over a greater length of time, for example, over minutes, hours, or even days. A user may desire to reduce the length of the source video to provide a shortened, timelapse video clip. The user may wish to share the video, as mentioned above, or, may simply desire shortened, timelapse playback.

SUMMARY

Disclosed herein is an adapative method whereby source video acquired over any given length of time is automatically processed to provide a short, timelapse video clip. To implement the method, a user need not know ahead of time the duration for which the source video will be acquired. Regardless of the acquisition time, the resulting video is automatically edited to provide a timelapse clip of a predefined length or of a length within a predefined range. The method involves saving images during recording but periodically deleting some of the images as filming continues. Moreover, the method involves decreasing the rate at which images are captured as the filming time increases. The method is adaptive, in that it adapts the effective acquisition frame rate as filming continues. Once acquisition has stopped, the saved images are encoded into a timelapse video clip. A further embodiment is an apparatus programmed to implement the adaptive methods described herein.

DESCRIPTION

Figure 1:
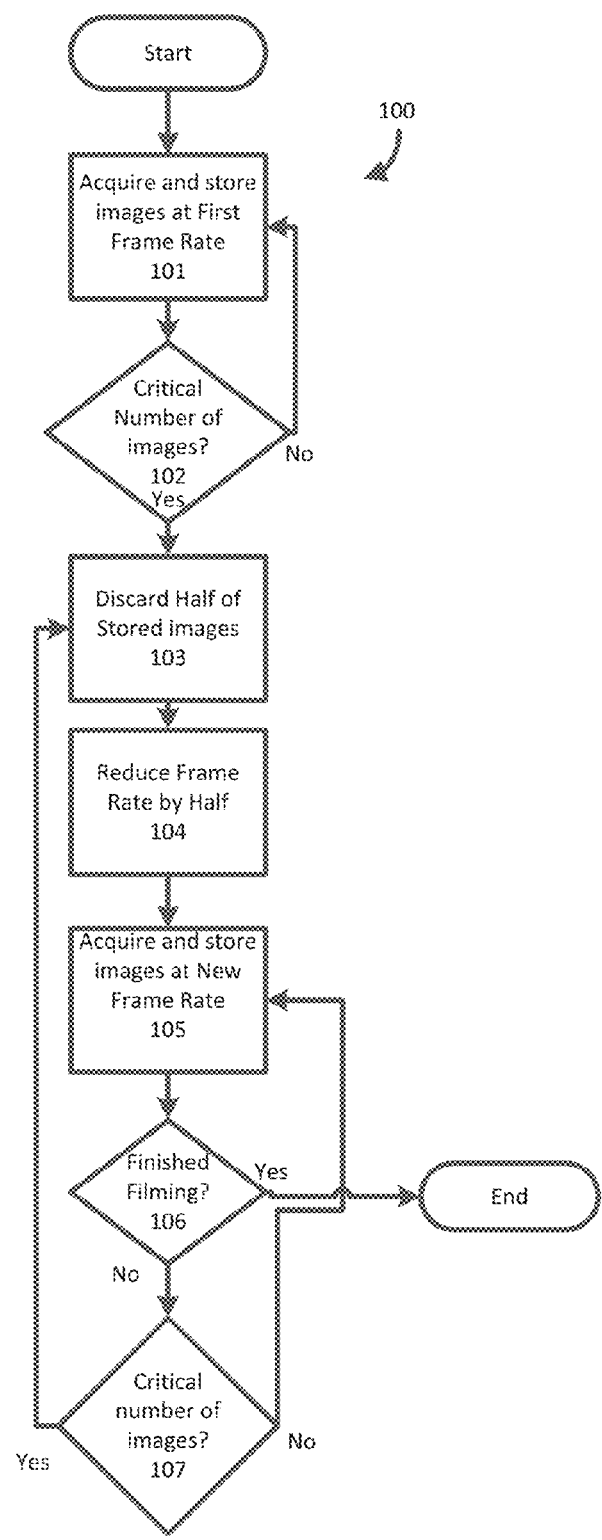
FIG. 1 is a flowchart illustrating an embodiment of the adaptive method described herein.

Systems, methods and program storage devices are disclosed, which provide instructions to cause one or more processing units to record timelapse video. The techniques disclosed herein are applicable to any number of electronic devices with displays: such as digital cameras, digital video cameras, mobile phones, personal data assistants (PDAs), portable music players, monitors, and, of course, desktop, laptop, and tablet computer displays.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

Timelapse reduces the playback time of a video compared to the length of time it took to acquire the video. The examples discussed herein focus on providing a timelapse clip of 20 to 40. But it will be appreciated that any duration may be chosen. A method of reducing a 40 second clip of source video to 20 seconds of timelapse video would be to: (1) acquire source video for 40 seconds at a frame rate of 30 fps, yielding 1200 images total; (2) discard half of the images (for example, discard every other image), yielding 600 images total; and (3) play the remaining 600 images back at 30 fps, yielding 20 seconds of timelapsed video. Because half of the images are discarded, the acquisition frame rate is "effectively" 15 fps, even though the video was actually acquired at 30 fps. Thus, the term "effective acquisition frame rate" is used herein to refer to the number of images remaining divided by the true acquisition time. When played back at 30 fps, the action in the video will appear to move at twice the speed as the "true-to-life" action. To create 20 seconds of timelapse video from a longer segment of source video, more images would have to be discarded. For example, 80 seconds of source video recorded at 30 fps would yield 2400 images. Discarding 1800 of those images (i.e., keeping every fourth image) would leave 600 images, again providing 20 seconds of timelapse video for playback at 30 fps.

As the length of time source video is acquired increases, the number of images that are discarded to yield the timelapse video increases also, and quickly far exceeds the number of images that are actually used. The acquisition and storage of those unused images consumes processing and storage resources that could otherwise be used for other operations.

An alternative to acquiring and then discarding the used images would be to not acquire them in the first place. For example, if the user acquired 40 seconds of source video at an acquisition frame rate of 15 fps (the same as the "effective frame rate" in the above example) instead of 30 fps, then they would collect a total of 600 images. Playing back those 600 images at 30 fps would yield 20 seconds of timelapse video. Likewise, the user could collect 80 seconds of source video at a rate of 7.5 fps to yield 600 images that could be played back at 30 fps to provide 20 seconds of timelapse video.

The problem with the alternative method is that the user must know, before they begin recording, how long they will be acquiring the source video in order to know what frame rate to use for the recording. For example, if the user acquires source video at a frame rate of 7.5 fps (e.g., they expect to acquire for 80 seconds) but only acquires source video for 20 seconds, then they will end up with only 300 images of video, providing only 10 seconds of timelapse video.

In many cases, when the user begins acquiring video, they may not know how long they will be filming. For example, if they are filming a sunset, the user may not know if they will wish to film for fifteen minutes or thirty minutes. The user, therefore, does not know ahead of time the factor by which to reduce the acquisition frame rate.

Herein is described an adaptive algorithm for acquiring and processing timelapse video. An embodiment of the adaptive algorithm is illustrated as a flow chart in FIG. 1. Referring to FIG. 1, a user has selected to record video using timelapse mode. Operation 100 begins with the camera recording images of video at a first frame rate (R) 101, having an associated image capture time interval (the time between image captures) $\Delta T = 1/R$. First frame rate (R) 101 can generally be any frame rate, but is typically a fast frame rate that is the same, or close to the same rate at which the camera records video during normal operation. For the purposes of this discussion, the first frame rate will be assumed to be 30 fps.

Recording proceeds at the first frame rate until a critical number of images of video are acquired. The critical number of images is determined by the desired playback time and playback rate. According to illustrated embodiment, the playback time is actually a range of times, t1 to t2. The reason a range, rather than a specific time, is specified will become apparent from the following explanation. For the purposes of this discussion, the playback rate will be assumed to be 30 fps and the playback time will be from t1=20 to t2=40 seconds. In other words, regardless of the length of time source video is recorded, playback will be from 20 to 40 seconds at 30 fps. According to the operation 100, the user does not select the playback time and frame rate. Instead, the user simply selects to record video in timelapse mode and the playback time and frame rate are pre-programmed into the device. According to other embodiments, the user may be able to select the playback time and frame rate. In either case, the playback time and frame rate determine the critical number of images, as follows: the critical number of images is the number of images that would provide the longest desired playback time at the playback frame rate. For example, if the longest desired playback time (as pre-programmed into the recording device or as chosen by the user) is 40 seconds and the playback frame rate is 30 fps, then the critical number of images would be 1200 images.

Once the critical number of images has been reached, half of the stored images are discarded 103 and the frame rate R is decreased to R/2. For example, if the initial acquisition frame rate is 30 fps and the critical number of images is 1200 images. Discarding half of the images leaves 600 images.

Generally, discarding half of the images is accomplished by discarding every other image. It will be apparent that discarding every other image doubles the capture time interval $\Delta T$ between each of the images, providing a series of images that effectively correspond to a image capture rate of 15 fps (R/2). Thus, the remaining 600 images have an effective acquisition frame rate of 15 fps.

Moreover, recording continues a R/2 (i.e., 15 fps in this example). If the process were stopped at that point, the 600 images remaining would provide 20 seconds of timelapsed video for playback at 30 fps. Recall playback will always be at 30 fps, regardless of the frame rate R used for recording the source video, in this example. A playback frame rate of 30 fps has been found to provide a pleasing playback experience. However, it will be appreciated that another frame rate may be chosen.

If recording continues and the critical number of images (i.e., 1200) is reached again, then, again, half of the images will be discarded 103 and the recording frame rate will again be reduced by half 104. Operation 100 can be executed for as long as the user desires. The user can stop recording at any time, which causes operation 100 to cease. At any time the user quits recording, there will be between 600 and 1200 images stored, providing between 20 and 40 seconds of timelapse playback at 30 fps. The acquisition frame rate adaptively decrease as the recording time increases. Moreover, the effective acquisition frame rate of the remaining images decreases as recording time increases.

Once operation 100 has stopped, the stored images are encoded into a movie clip according to a video encoding protocol, such as MPEG. It will be appreciated that other encoding protocols can be used, as are known in the art. The video is encoded at a predetermined frame rate (i.e., 30 fps in the illustration). The total playback time is determined by the number of stored images at the time recording was stopped. In the example, there are between 600 and 1200 stored images at any given time, giving between 20 and 40 seconds of timelapse playback. According to an alternative embodiment, the total playback time can be predetermined and the playback speed can be adjusted based on the number of images in memory.

It will be apparent that many modifications of operation 100 are possible. For example, it may be desirable to begin with a lower frame rate, for example, 2 fps. If an initial frame rate of 2 fps is used instead of 30 fps, and if the critical number of images is 1200, then the critical number will be reached after recording for 10 minutes.

Figure 2:
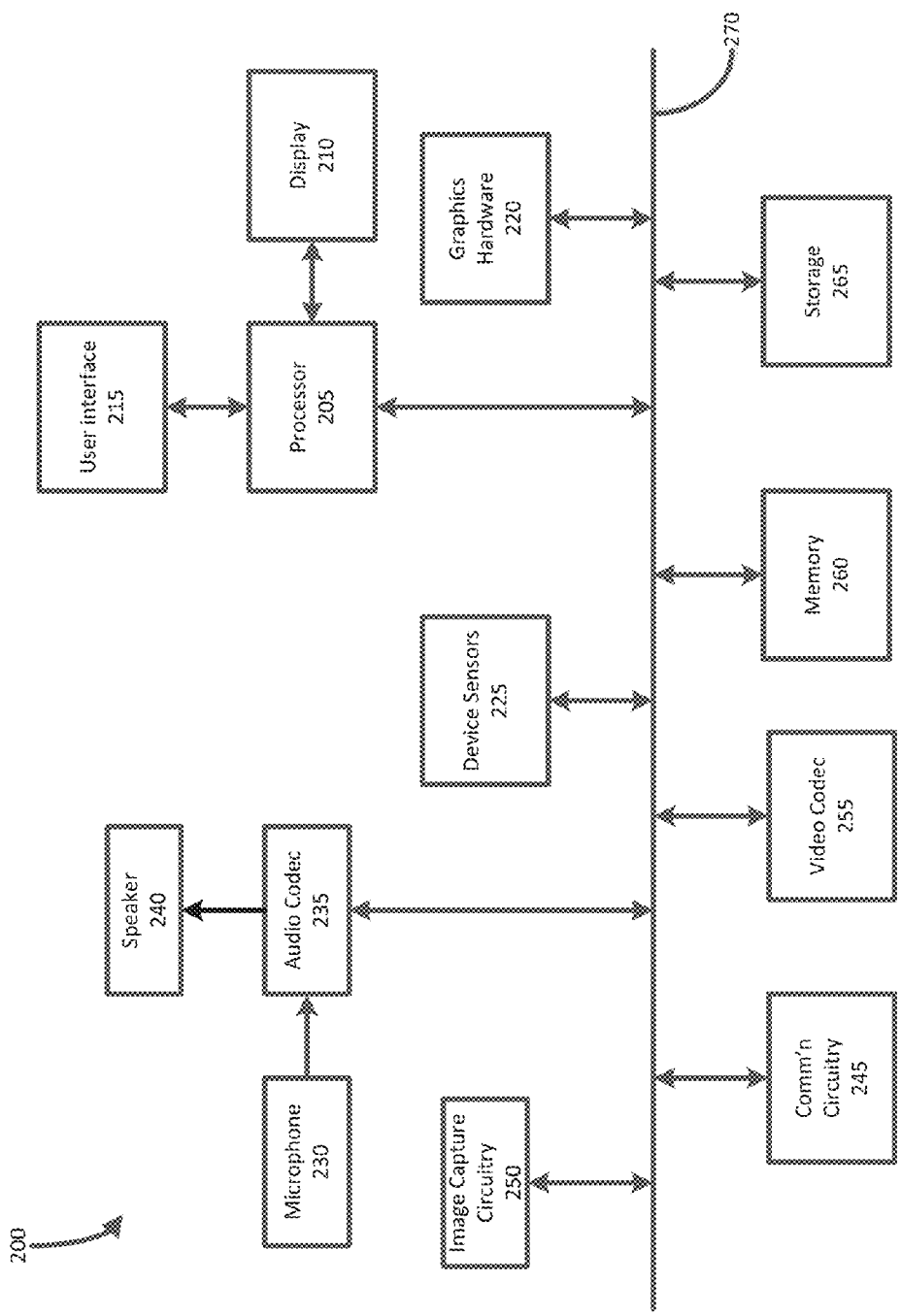
FIG. 2 illustrates an programmable device in accordance with one embodiment.

FIG. 2 is a block diagram schematically illustrating an embodiment of an apparatus for performing the methods described herein. Electronic device 200 may include processor 205, display 210, user interface 215, graphics hardware 220, device sensors 225 (e.g., proximity sensor/ambient light sensor, accelerometer and/or gyroscope), microphone 230, audio codec(s) 235, speaker(s) 240, communications circuitry 245, digital image capture unit 250, video codec(s) 255, memory 260, storage 265, and communications bus 270. Electronic device 200 may be, for example, a personal digital assistant (PDA), personal music player, a mobile telephone, or a notebook, laptop or tablet computer system.

Processor 205 may execute instructions necessary to carry out or control the operation of many functions performed by device 200 (e.g., such as the generation and/or processing of timelapse video in accordance with operation 100). Processor 205 may, for instance, drive display 210 and receive user input from user interface 215. User interface 215 can take a variety of forms, such as a button, keypad, dial, a click wheel, keyboard, display screen and/or a touch screen. Processor 205 may be a system-on-chip such as those found in mobile devices and include a dedicated graphics processing unit (GPU). Processor 205 may be based on reduced instruction-set computer (RISC) or complex instruction-set computer (CISC) architectures or any other suitable architecture and may include one or more processing cores. Graphics hardware 220 may be special purpose computational hardware for processing graphics and/or assisting processor 205 process graphics information. In one embodiment, graphics hardware 220 may include a programmable graphics processing unit (GPU).

Sensor and camera circuitry 250 may capture still and video images that may be processed to generate images in accordance with this disclosure. Output from camera circuitry 250 may be processed, at least in part, by video codec(s) 255 and/or processor 205 and/or graphics hardware 220, and/or a dedicated image processing unit incorporated within circuitry 250. Images so captured may be stored in memory 260 and/or storage 265. Memory 260 may include one or more different types of media used by processor 205, graphics hardware 220, and image capture circuitry 250 to perform device functions. For example, memory 260 may include memory cache, read-only memory (ROM), and/or random access memory (RAM). Storage 265 may store media (e.g., audio, image and video files), computer program instructions or software, preference information, device profile information, and any other suitable data. Storage 265 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 260 and storage 265 may be used to retain computer program instructions or code organized into one or more modules and written in any desired computer programming language. When executed by, for example, processor 205 such computer program code may implement one or more of the methods described herein.

Referring again to FIGS. 1 and 2, as images are acquired (i.e., steps 101, 106) they are typically saved according to an image compression method, such as JPEG compression. Because at a various times during operation 100 it is not predetermined which image images will be the final set of images at the end of the operation, it is generally difficult to begin encoding video until operation 100 is completed and the final set of images is determined. As such, images are generally written to storage 265 as they are collected. In the above description of operation 100, there are between 600 and 1200 image images saved at any given time. At 1080 resolution, each of those images compressed as JPEGs are slightly less than 1 MB in size. Given the amount of image data being stored, each image is generally written to storage 265 rather than being retained in memory 260.

It is generally not optimal to compress the images iteratively based on their neighbors, because, as pointed out above, the final set of images is not determined until the operation is completed. More aggressive compression techniques can therefore be difficult to implement. However, if particular image images are predicted ahead of time to be deleted, then more aggressive compression techniques can be implemented to reduce the size of the image data. For example, if operation 100 is implemented such that all odd numbered images are generally deleted, then all or some of the odd numbered images can be more aggressively compressed. Likewise, if particular images are slated to be deleted based on an image parameter, as described in more detail below, then those images can be aggressively compressed.

Once operation 100 has stopped, the stored images are encoded into a movie clip according to a video encoding format, such as one of the MPEG formats. It will be appreciated that other encoding formats, such as HEVC, Dirac, RealVideo, etc., can be used, as known in the art.

Figure 3:
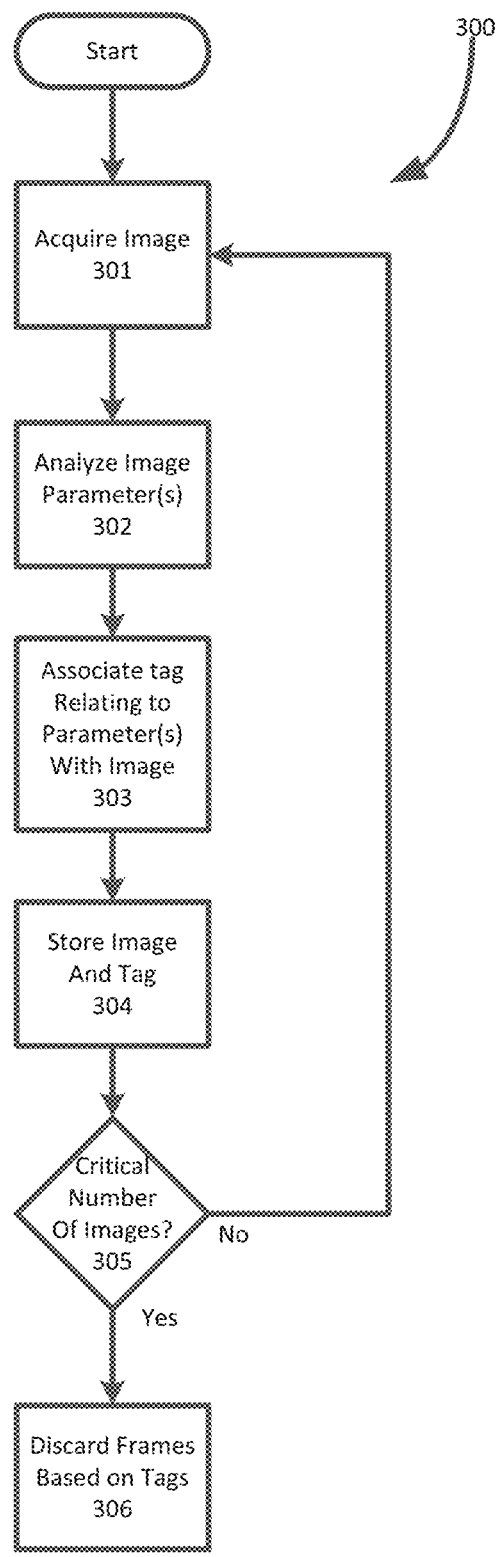
FIG. 3 is a flowchart illustrating a method of analyzing an image parameter and associating a tag based on the parameter with images.

FIG. 3 illustrates an operation 300 wherein one or more image parameters are analyzed as the images are acquired. Examples of parameters that can be analyzed are exposure value (EV), motion parameters, sharpness, blur, facial recognition parameter, and the like. As images are acquired 301, one or more parameters are analyzed 302. A tag relating to the analyzed parameter can be associated with the image 303. When the image is stored, the tag and association is stored also 304. Acquisition continues until a predefined critical number of images are stored 305. Once a predefined critical number of frames are stored 305, frames are deleted based on the analyzed parameter 306.

Operation 300 allows images to be discarded in an intelligent fashion. For example, if an anomaly is detected in an image, that image can be tagged for deletion. Perhaps the camera is disturbed or obscured during image acquisition. If that event causes an anomaly in the measured parameter, then the corresponding frame may be slated for deletion. Many techniques of implementing the tagging operation 300 will be apparent to the skilled artisan. For example, the default operation may call for all odd numbered images to be deleted. But the operation may check for any anomalous images within one or two neighboring images and delete the anomalous images preferentially. Generally, it will not be desirable to delete several consecutive images. According to an alternative embodiment, tagged images may not be deleted. Rather, the tag(s) is maintained with the images and embedded into the resulting output movie file such that the tag(s) can be used to inform further video editing.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause one or more processing units to:
execute one or more iterations of an operation, each iteration comprising:
obtaining, by a first camera, a first plurality of images at a first capture frame rate;
storing the first plurality of images;
discarding a portion of the stored first plurality of images in response to a predefined critical number of images that were obtained at the first capture frame rate being stored;
selecting, in response to the discarding, a second capture frame rate, the second capture frame rate being lower than the first capture frame rate;
obtaining, by the first camera, a second plurality of images at the second capture frame rate;
storing the second plurality of images with the first plurality of images that were not discarded;
cease execution of the operation; and
encode the stored first plurality of images and the stored second plurality of images to produce a video, the video having a playback frame rate and a playback duration, wherein either the playback frame rate or the playback duration is predefined prior to the obtaining of the first plurality of images and the second plurality of images.

2. The non-transitory program storage device of claim 1, wherein discarding a portion of the stored first plurality of images comprises deleting half of the stored first plurality of images.

3. The non-transitory program storage device of claim 1, wherein the operation further comprises analyzing an attribute of the first plurality of images, and wherein discarding a portion of the stored first plurality of images is based on the analyzing.

4. The non-transitory program storage device of claim 1, wherein the predefined critical number of images is based on a range of playback durations at a predefined playback frame rate.

5. The non-transitory program storage device of claim 1, wherein the predefined critical number of images is based on a predefined playback duration.

6. The non-transitory program storage device of claim 1, wherein the playback duration is predefined and the playback frame rate is determined by the predefined playback duration.

7. The non-transitory program storage device of claim 1, wherein the encoding is according to a video compression format.

8. A computer-implemented method for producing a video, comprising:
executing one or more iterations of an operation, each iteration comprising:
obtaining, by a first camera, a first plurality of images at a first capture frame rate with an image sensor;
storing the first plurality of images;
discarding a portion of the stored first plurality of images in response to a predefined critical number of images that were obtained at the first capture frame rate being stored;
selecting, in response to the discarding, a second capture frame rate, the second capture frame rate being lower than the first capture frame rate;
obtaining, by the first camera, a second plurality of images at the second capture frame rate with the image sensor;
storing the second plurality of images with the first plurality of images that were not discarded;
ceasing execution of the operation; and
encoding the stored first plurality of images and the stored second plurality of images to produce a video, the video having a playback frame rate and a playback duration, wherein either the playback frame rate or the playback duration is predefined prior to the obtaining of the first plurality of images and the second plurality of images.

9. The method of claim 8, wherein discarding a portion of the stored first plurality of images comprises deleting half of the stored first plurality of images.

10. The method of claim 8, further comprising analyzing an attribute of the first plurality of images, and wherein discarding a portion of the stored first plurality of images is based on the analyzing.

11. The method of claim 8, wherein the predefined critical number of images is based on a range of playback durations at a predefined playback frame rate.

12. The method of claim 8, wherein the predefined critical number of images is based on a predefined playback duration.

13. The method of claim 8, wherein the playback duration is predefined and wherein the playback frame rate is determined by the predefined playback duration.

14. The method of claim 8, wherein the encoding is according to a video compression format.

15. The method of claim 14, wherein the video compression format is an MPEG format.

16. An electronic device comprising:
an image sensor,
a memory operatively coupled to the image sensor, and
at least one processor operatively coupled to the memory and the image sensor, wherein the at least one processor is programmed to:
cause the image sensor to acquire a first plurality of images separated by a first image capture time interval;
cause the memory to store the first plurality of images;

discard a portion of the stored first plurality of images that were obtained with the first image capture time interval in response to a predefined critical number of images being stored;

select, in response to the discarding, a second image capture time interval, the second image capture time interval being longer than the first image capture time interval;

cause the image sensor to obtain a second plurality of images separated by the second image capture time interval; and cause the memory to store the second plurality of images with the first plurality of images that were not discarded.

17. The electronic device of claim 16, wherein the processor is further programmed to analyze an attribute of each image of the first plurality of images.

18. The electronic device of claim 17, wherein the attribute is selected from the group consisting of exposure value, motion parameters, sharpness, blur, and facial recognition.

19. The electronic device of claim 17, wherein discarding the portion of the stored first plurality of images is based on the analyzing an attribute of each image of the first plurality of images.

20. The electronic device of claim 16, further comprising a video codec, wherein the processor is programmed to cause the video codec to encode the stored first plurality of images and the stored second plurality of images to produce a video.

\* \* \* \* \*